No. 729,140. PATENTED MAY 26, 1903.
R. DARLING.
STORAGE BATTERY.
APPLICATION FILED DEC. 26, 1901.
NO MODEL.
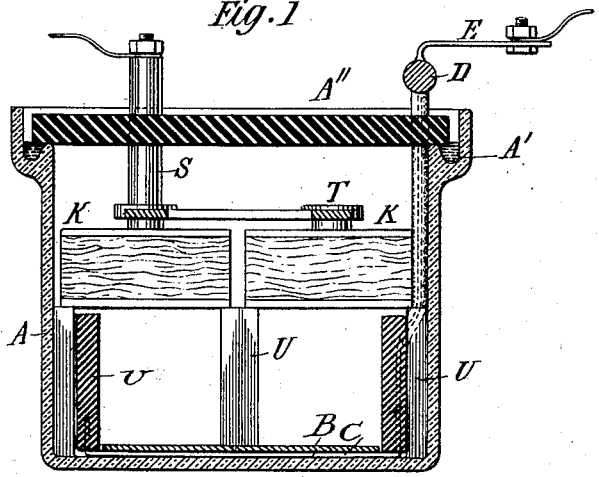
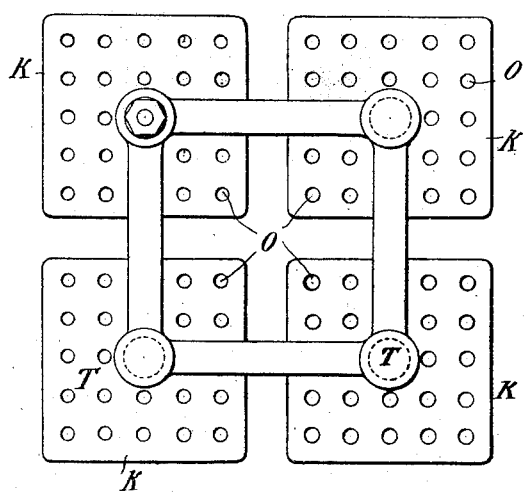
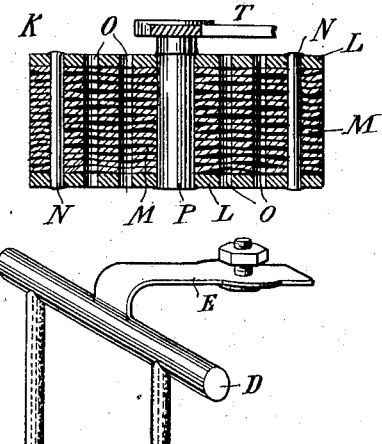
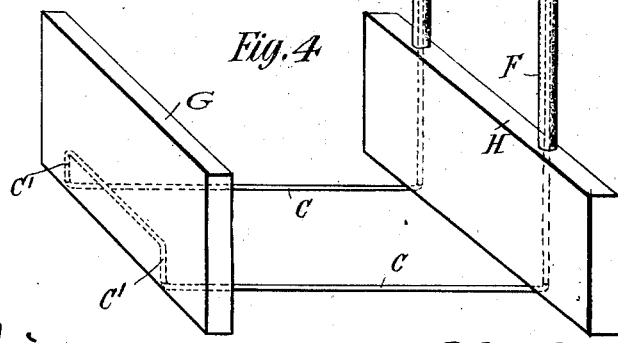
Witnesses:
Benjamin Miller
Richard Norman
Robert Darling, Inventor
by Kerr Page & Cooper, Attys.

No. 729,140. Patented May 26, 1903.

UNITED STATES PATENT OFFICE.

ROBERT DARLING, OF RYE, NEW YORK.

STORAGE BATTERY.

SPECIFICATION forming part of Letters Patent No. 729,140, dated May 26, 1903.

Application filed December 26, 1901. Serial No. 87,180. (No model.)

*To all whom it may concern:*

Be it known that I, ROBERT DARLING, a citizen of the United States, residing at Rye, in the county of Westchester and State of New York, have invented certain new and useful Improvements in Secondary or Storage Batteries, of which the following is a specification, reference being had to the drawings accompanying and forming a part of the same.

The invention which forms the subject of my present application is an improvement in secondary or storage batteries, particularly of the lead-zinc type, in which a negative element of lead is used in conjunction with a positive amalgamated zinc element in an electrolytic solution, and more specifically to that form of such batteries in which the elements are supported horizontally one above the other.

The improvements in the present case will be described and illustrated as embodied in a battery of the kind referred to.

One of the chief features of my invention resides in the manner in which the negative element is constructed. Heretofore these elements, whether used singly or in numbers in a cell, have been in the form of plates or a plurality of sheets secured together to form laminated plates of a size corresponding to the capacity or dimensions of the cell in which it or they are used; but this fact often results in considerable waste and loss, since any local injury to or disorganization of a plate destroys, by reason of the unitary nature of its structure, the usefulness of the plate as a whole and necessitates its replacement by an entirely new one. It has, moreover, been found that large plates are very liable to buckle or become distorted in the use of the battery, which renders them peculiarly liable to injury if not destruction. To avoid this, I make my negative plate or element in a plurality of sections each constituting a distinctive unit, and these unit-sections are assembled in any desired number, according to the size of plate required, and each is independently connected to and, preferably in part at least, supported by a conducting grid or connector. I also effect the connection between each of such sectional units and the grid so that the mass of material of which each is composed will be symmetrically disposed with respect to the point of contact, from which it follows that the electrical actions affecting the sections will be much more uniform. In addition to these features I have devised special and improved ways of constructing the plate-sections and attaching them to the grid and certain novel and very effective devices for supporting the positive or zinc element and completing the connection between the same and the external circuit and other details in the construction of the battery, which will be more fully described by reference to the accompanying drawings.

In the said drawings, Figure 1 is a vertical section of a cell of my improved battery, showing the parts contained therein in elevation. Fig. 2 is a top plan view of a negative element made up of four units. Fig. 3 is a side view and part section of one of such units, and Fig. 4 is a view in perspective of the connector and support for the positive or zinc element.

A is a jar or cell of any suitable material, preferably of glass and of any convenient form, but provided with a continuous interior groove or channel A' in an offset or shoulder near its rim to contain an oily or greasy substance which will prevent creeping of salts over the edges of the jar. Each cell or jar is provided with a lid or cover A'', of insulating material. The positive element is supported at the bottom of the jar and is composed of an amalgamated zinc plate B. This plate is connected to the circuits by the device illustrated in detail in Fig. 4 and which in general terms comprises copper conductors C C, with horizontal exposed or bared portions, upon which the plate B rests, and insulated and protected vertical portions united to a lead terminal. The manner of constructing this device is in detail as follows: Two straight copper wires C C are united to a transverse bar or cylinder D, of lead, preferably by casting the latter in a suitable mold around the ends of said wires. The bar D is also provided with a tongue E, which serves as a terminal. After uniting the wires C to the bar D they are coated over such portions as are to extend vertically through the cell with a suitable greasy substance to prevent their amalgamation and consequent access of the mercury used in the battery to the lead D. Tubes or sleeves F, of rubber or other insulating material, are then slipped over the portions of wire thus protected. At the ends of the insulating-sleeves F the wires C are bent at right angles to form the horizontal portions, which are to extend across the bottom of the cell. At the ends of such portions the wires are again bent at right angles to form short upright portions C' C'. The ends C' C' are embedded in a body G, of insulating material, upon the top of which the negative plate rests when the battery is finally assembled for use. A similar body of insulating material H is secured to the lower portions of the insulating-sleeves F for the purpose of affording a ledge or offset for the negative plate to rest upon. By this means the connector is securely held down in its proper position in the cell by the weight of the negative plate.

The essential features of the connector for the positive element being, as described above, conductors with protected vertical portions, bared horizontal portions, and insulating attachments at or near the ends of the horizontal portions, which by contact with the negative plate prevent displacement of the connector, it is obvious that the special form or mode of application to the conductors of the said insulating bodies is unimportant. It is also evident that instead of two wires a single wire bent to the general U form (indicated by dotted lines in Fig. 4) may be employed. I prefer, however, to use two wires and to embed their free ends in a plate G, of hard rubber, and to employ a similar plate H at the opposite side of the cell, which is formed with perforations permitting it to be slipped over the ends of sleeves F before the wires are bent.

My negative plate or element, as stated above, is made up of a number of sections or units K K, generally not less than four and as many more as may be desired. Each section or unit is, in fact, a complete plate in itself, and the number used will be determined by the dimensions of the cell or the capacity of the battery. As all of these units are alike in construction, it is only necessary to describe one in detail, for which purpose reference is made to Fig. 3.

L L are comparatively thick plates of antimonious lead, which while conducting is not materially affected by the electrical or chemical actions going on in the battery. Between these plates are a number of thin sheets or plates of lead M, which are primarily corrugated and then firmly pressed together. The laminated element thus formed is bound together by bolts N, of antimonious lead, passing through suitable perforations and riveted or fused to the outer plates M. Numerous perforations O are also formed through the entire pile of sheets and plates, preferably by punching holes in each sheet and plate before they are superposed.

The original corrugations of the lead sheets while very much reduced by the pressure applied for compacting the element are not fully leveled down, but leave interstitial channels, through which the electrolyte permeates, and this is further facilitated by the presence of the transverse perforations O.

Through each unit or plate K there is formed a central perforation to receive a stem P, of antimonious lead, which is intimately united, generally by the ordinary process of burning to both of the end or outside plates L L. By means of these stems P the plates K are united to a grid R, which is a frame cast of antimonious lead and provided with an upright S, which serves as a terminal, and as many perforated enlargements T as are required in any particular case.

The stems P may be integral with the grid; but it is more desirable to unite them thereto by burning after their attachment to the plates.

When the proper number of unit-sections K to make up a plate of the desired size have been attached to the grid R, the element thus formed is let down into the cell over the zinc element until its under side rests upon projections or supports U, generally molded as a part of the walls of the cell. In this position the negative element should be nearly or quite in contact with the insulating-plates G H, so as to keep the positive connector firmly in place. The cover A" is then put on, and the cell is complete.

The operation of and manner of using the battery are matters which are familiar to electricians. It being understood that the negative plates are suitably treated or formed previously to their introduction into the cell and that the latter is filled with an acidulated solution, the battery is charged by passing a current through it from the lead to the zinc element. This results in the formation of a layer of spongy zinc and mercury on the positive plate and the oxidation of the negative plate. If then the battery be discharged, it will be found to produce a remarkably high electromotive force and to yield a steady flow of current.

By exhaustive tests and severe usage I have found this battery to be highly efficient, economical, and practical. It is little liable to injury from improper charging or abnormal discharge and possesses remarkable durability.

What I claim as new, and desire to secure by Letters Patent, is—

1. In a secondary or storage battery the combination with a positive element of a negative plate supported horizontally above the same, and composed of sectional units, and a conducting-grid to which each of said units is independently connected.

2. In a secondary or storage battery the combination with a positive element of a negative plate supported horizontally above the same and composed of unit-sections of laminæ of lead compacted and secured together between plates of antimonious lead, and a conducting-grid to which each of said sections is independently connected.

3. In a secondary or storage battery the combination with a positive element of a negative plate supported horizontally, and composed of perforated sectional units each consisting of a superposed series of lead sheets between end plates of antimonious lead, and a conducting-grid of antimonious lead to which each of said sections is independently connected.

4. In a secondary or storage battery, the combination with a negative element, of a positive element consisting of an amalgamated zinc plate supported horizontally beneath the same, conductors having horizontal portions in contact with the zinc plate and vertical portions extending up through the cell, and insulating bodies secured to the said conductors and extending up to the negative element and serving to prevent displacement of the conductors.

5. In a secondary or storage battery the combination with horizontal plates or elements of a connector for the lower or positive element having horizontal bared or exposed metallic surfaces and insulating projections at the ends of the bared portions and upon which the upper or negative plate or element rests.

6. In a secondary or storage battery the combination with horizontal plates or elements, of a connector for the lower or positive element having a horizontal portion with exposed or bared metallic surfaces upon which the positive element rests, and an insulated vertical portion, and insulated projections at the ends of the exposed portions and upon which the upper or negative plate or element rests.

7. In a secondary or storage battery, the combination with a negative element and a positive element consisting in part of mercury, of a metallic connector extending from the positive element up through the electrolyte, a protector for the portion of the connector not in contact with the element composed of a coating of a greasy substance and a sheathing of insulating material, as set forth.

ROBERT DARLING.

Witnesses:
STILLMAN H. STORY,
P. ANDREW HOLM.